(12) United States Patent
Timmins et al.

(10) Patent No.: US 6,780,334 B1
(45) Date of Patent: Aug. 24, 2004

(54) SEPARATING APPARATUS AND METHOD OF SEPARATING

(76) Inventors: John Andrew Timmins, 104 High Hill, Essington, Wolverhampton, West Midlands (GB), WV11 2DW; John Timmins, 104 High Hill, Essington, Wolverhampton, West Midlands (GB), WV11 2DW ( * ) Notice: Subject to any disclaimer, the term of this patent is extended or adjusted under 35 U.S.C. 154(b) by 293 days.

(21) Appl. No.: 09/980,060

(22) PCT Filed: Jun. 5, 2000

(86) PCT No.: PCT/GB00/02181

§ 371 (c)(1),
(2), (4) Date: Nov. 29, 2001

(87) PCT Pub. No.: WO00/74809

PCT Pub. Date: Dec. 14, 2000

(30) Foreign Application Priority Data

Jun. 5, 1999 (GB) .............................. 9913000
Aug. 21, 1999 (GB) .............................. 9919741
Mar. 30, 2000 (GB) .............................. 0007601

(51) Int. Cl.$^7$ ............................................. B01D 17/02
(52) U.S. Cl. ................. 210/799; 210/806; 210/114; 210/121; 210/314; 210/435; 210/496; 210/502.1
(58) Field of Search ................. 210/799, 806, 210/112, 114, 121, 314, 435, 496, 502.1

(56) References Cited

U.S. PATENT DOCUMENTS 3,794,583 A  2/1974 Rhodes
4,061,573 A  12/1977 Biron
4,308,146 A  12/1981 Gagle et al.
4,588,505 A  5/1986 Walley et al.
4,601,825 A  7/1986 Eriksson
4,758,350 A  7/1988 Pitts et al.
5,178,778 A  1/1993 Sachse et al.
5,264,134 A  11/1993 McCamy
5,718,015 A  2/1998 Rohrbacher

FOREIGN PATENT DOCUMENTS

DE  3113227  10/1982
DE  9004019  7/1990
DE  4200152  8/1993
DE  19549194  7/1997
EP  531 586  3/1993
GB  2 128 495  5/1984
JP  043322742  11/1992

*Primary Examiner*—Robert A. Hopkins
(74) *Attorney, Agent, or Firm*—Marshall, Gerstein & Borun LLP

(57) ABSTRACT

An apparatus for separating from a liquid mixture, first and second liquid components such as oil and water, wherein the first liquid has a greater density than the second liquid, includes a vessel (10) having an inlet (13) through which the mixture is introduced into the vessel (10), and an outlet (14) through which separated first liquid is in use discharged, and there being a separating member (12) within the vessel (10), the mixture being constrained to contact the separating member (12), the separating member (12) including a material which adsorbs the second liquid component characterised in that the separating member (12) is adapted to move in the vessel (10) downwardly in response to an increase in the weight thereof as second liquid component is adsorbed.

13 Claims, 5 Drawing Sheets

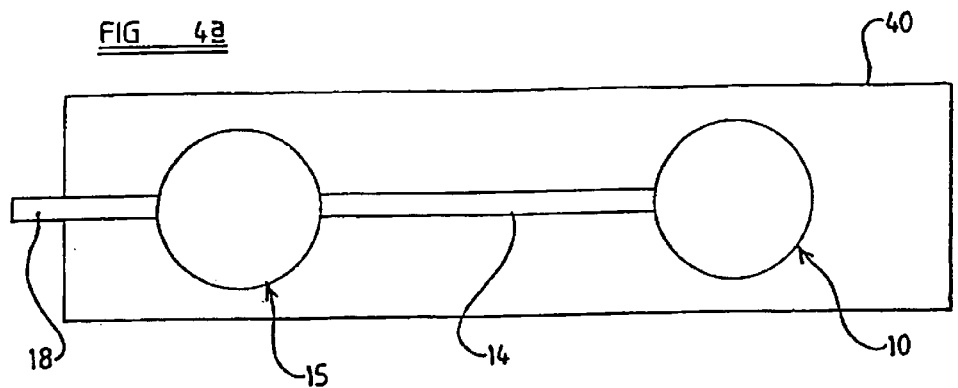
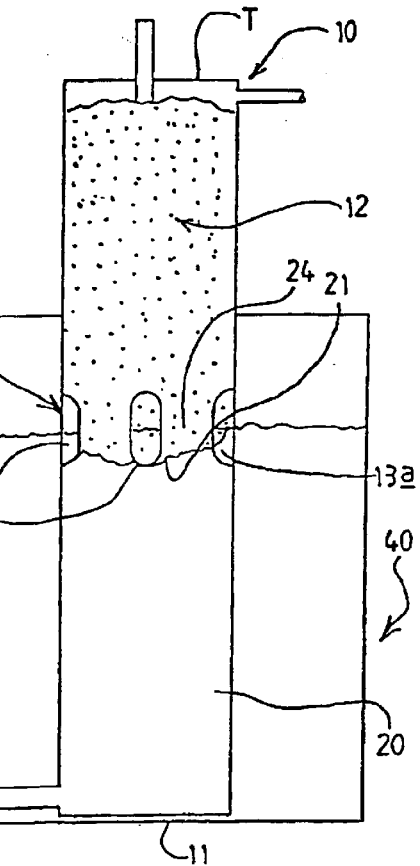

SEPARATING APPARATUS AND METHOD OF SEPARATING

DESCRIPTION OF INVENTION

This invention relates to a separating apparatus and more particularly but not exclusively to an apparatus for separating oil and water from a mixture thereof.

The invention has been developed particularly but not exclusively for separating oil and water from condensate from an air compressor machine, but may be used in other applications for separating from a liquid mixture, two liquid components of differing density.

To comply with legislation it is a requirement that before condensate from an air compressor machine can be disposed of into for example, a drain, or onto the ground, oil has to be removed as required to reduce the contamination to less than 20 parts per million (ppm).

Separating devices are known which collect the condensate in a settling tank which includes a weir over which the lighter oil component is intended to flow, whilst the heavier mainly water component passes towards the bottom of the tank from where it is discharged. The mainly water component is then subjected to filtering for example, to remove any entrained matter and residual oil.

However where the mixture of oil and water form a thick emulsion some of the oil is in solution, such weir devices do not operate well. This is because the thick "mayonnaise" like consistency mixture floats on the heavier mainly water component with a substantial proportion of the "mayonnaise", below the surface of the mainly water component. Thus this does not easily pass over the weir. Thus the vessel becomes filled with "mayonnaise" consistency mixture which eventually may flow from the vessel with the mainly water component and contaminate the filter.

It has been proposed to protect the filter, which typically is a carbon filter, by the use of an oleophillic material e.g. contained in a bag. However the amount of oleophillic material which has been used has been small such that the primary separating device has been the weir, and the oleophillic material can quickly become overloaded leaving the filter susceptible to blockage.

According to one aspect of the invention we provide an apparatus for separating from a liquid mixture, first and second liquid components, wherein the first liquid component has a greater density than the second liquid component, the apparatus including a vessel having an inlet through which the mixture is introduced into the vessel, and an outlet through which separated first liquid is in use discharged, and there being a separating member within the vessel, the mixture being constrained to contact the separating member, the separating member including a material which adsorbs the second liquid component characterised in that the separating member is adapted to move in the vessel downwardly in response to an increase in the weight thereof as second liquid component is adsorbed.

Such an apparatus has been found to be very efficient at separating the first and second liquid components. Because the separating member moves downwardly in the vessel as the adsorbing material adsorbs second liquid component, material which is unsaturated with second liquid component may continuously be presented at the surface of the liquid in the vessel, where the lighter second liquid component tends to settle. When the separating member has moved down in the vessel to a low position, having adsorbed a maximum volume of the second liquid material, the separating member, or at least the adsorbing material, may be disposed of.

The inlet may be positioned above the outlet so that liquid flows through the vessel under gravity. In one embodiment the inlet is positioned above the separating member, and the outlet is positioned towards a bottom of the vessel. Thus the mixture passes down through the adsorbing material. Some of the second liquid is likely to be adsorbed during this passage.

Preferably therefore the inlet is positioned at a height between a top and bottom of the vessel generally at a level at which a lower part of the separating member is located prior to any second liquid being adsorbed thereby.

Thus the heavier first liquid component will pass downwardly through separating member which may already have adsorbed second liquid component, whilst the adsorbing material of the separating member above the inlet will be unsaturated.

In each case, the outlet of the vessel may be connected to an upwardly extending chamber which has an outlet for the first liquid component, the liquid level in the vessel being governed by the height of the outlet from the chamber. Thus mixture may be continuously or intermittently introduced into the vessel through the inlet, with a commensurate volume of first liquid component flowing from the outlet from the chamber, so that there is no risk of overfilling the vessel, i.e. the surface of the liquid in the vessel is maintained at a constant level.

In a preferred embodiment the upwardly extending chamber includes a filter means such as a carbon filter, for filtering from the first liquid component any entrained matter and/or residual second liquid component. However if desired, a filter means may be provided in the vessel between the separating member and the outlet.

In one arrangement the separating member is adapted to float in the vessel at a level determined by the volume of second liquid adsorbed thereby. To compensate for the weight of the separating member itself, to ensure that no or a minimal amount of the separating member is submerged in the liquid in the vessel prior to any second liquid component being adsorbed by the adsorbing material, thereby, the separating member may include a float to increase the buoyancy of the member. Thus initially the separating member floats so that a lower part thereof is at a desired height in the vessel, e.g. at the level of the inlet.

As an alternative to a float, any other support means may be provided, such as a spring means or counterbalance, to support the separating member in the vessel so that prior to the adsorbing material of the separating member adsorbing second liquid component, a lower part of the separating member is at a desired height in the vessel.

The adsorbing material of the separating member may be oleophillic such that the separating material is active to adsorb from a liquid mixture of oil and water, oil, for example oil contained in a liquid mixture being liquid condensate from an air compressor machine.

According to a second aspect of the invention we provide a method of separating from a liquid mixture, first and second liquid components, wherein the first liquid component has a greater density than the second liquid component, the method including introducing into a vessel through an inlet thereof the mixture, constraining the mixture to contact a separating member in the vessel, which member includes a material which adsorbs the second liquid component, and discharging from the vessel through an outlet thereof separated first liquid component, characterised in that the separating member is adapted to move in the vessel downwardly in response to an increase in the weight thereof as second liquid component is adsorbed thereby, and mixture is introduced into the vessel until the separating member has moved to a low position in the vessel.

The method may include filtering any entrained matter and residual second liquid component from the separated first liquid subsequent to contacting the mixture with the adsorbing material of the separating member. For example the separated first liquid component may be discharged from the vessel prior to filtering.

The liquid level in the vessel may be controlled by the level of an outlet from an upwardly extending chamber which is connected to the vessel outlet.

The invention will now be described with reference to the accompanying drawings in which:

FIG. 4 is a view similar to FIG. 1 but of another embodiment;

FIG. 4a is a plan view of the apparatus of FIG. 4;

Figure 1:
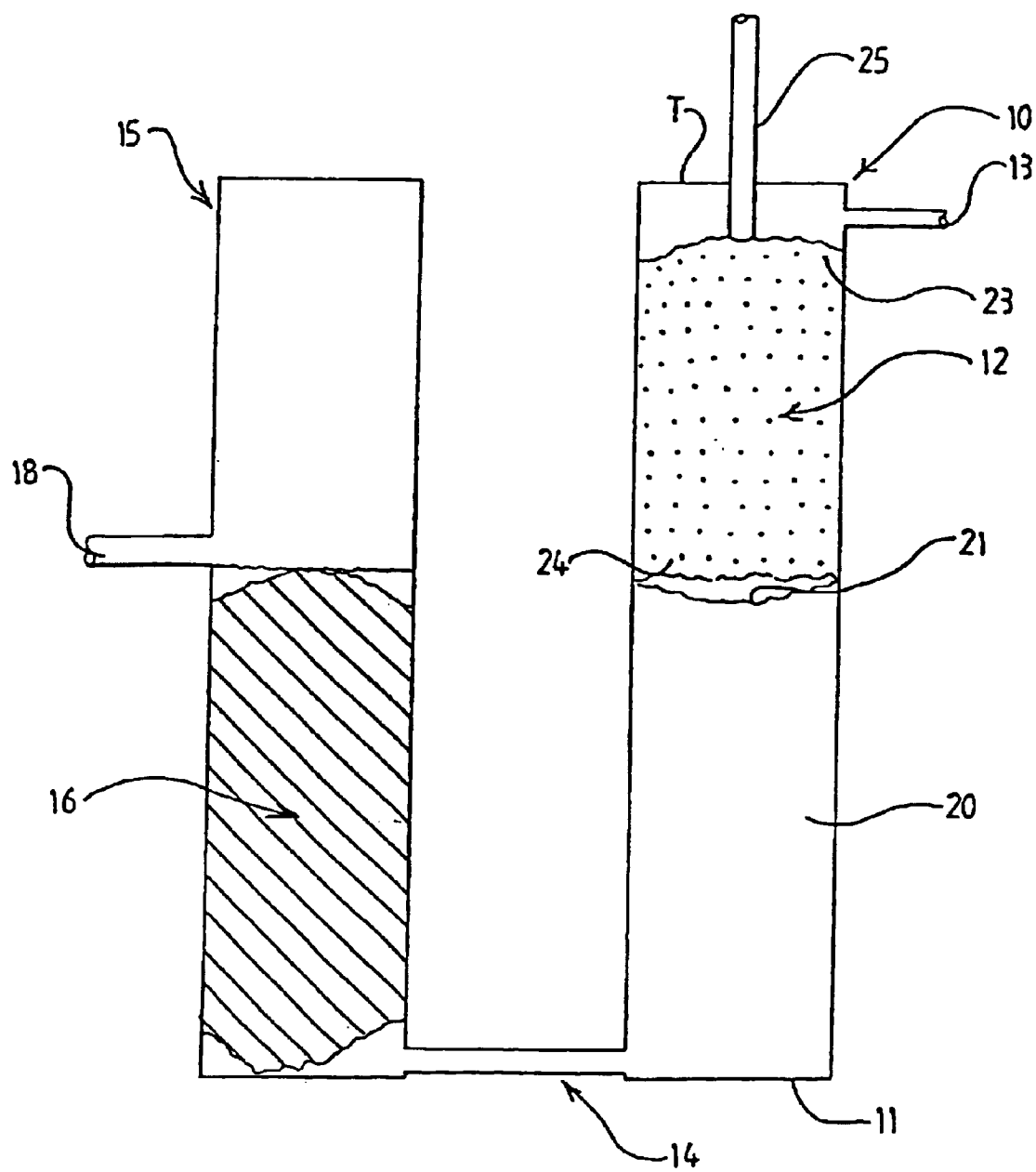
FIG. 1 is a side illustrative view of an apparatus in accordance with the invention with a separating member thereof in a first position in a vessel.
Figure 2:
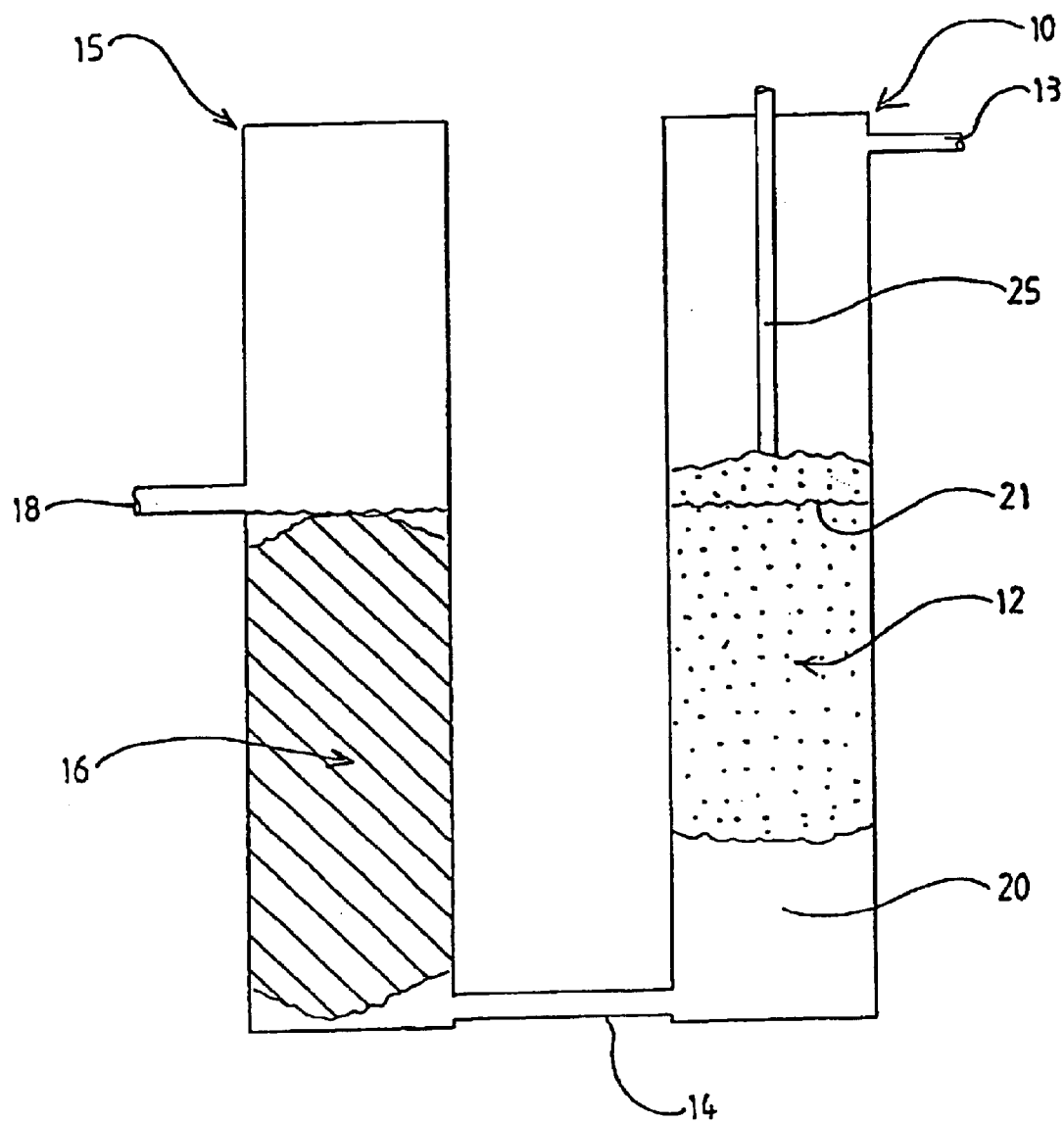
FIG. 2 is a view similar to FIG. 1 but showing the separating member in a second low position.

Referring to FIG. 1 and FIG. 2 a primary vessel 10 which contains a separating member 12 being in this example a bag containing oleophillic material, has an inlet 13 located towards a top end T of the vessel 10 but may be positioned elsewhere provided that a liquid mixture of, in this example oil and water being condensate from an air compressor machine, may thus be introduced into the vessel 10 and into contact with the bag 12 of oleophillic material. One alternative arrangement is described below with reference to FIG. 4. Towards a bottom end 11 of the vessel 10 there is an outlet 14 which is connected as hereinafter described to an upwardly extending chamber 15, which in this example is a secondary vessel containing a filter 16, i.e. a carbon filter, which may be contained in a bag as indicated.

The chamber 15 has an outlet 18 from which first liquid component may be discharged. Thus the liquid level in the primary vessel 10 is governed and controlled by the level of the outlet 18 from the chamber 15, in that as liquid mixture enters the primary vessel 10, a generally equal volume of liquid is discharged from the outlet 18.

The bag 12 of oleophillic material is generally a loose fit in the vessel 10, and has a natural buoyancy such that the bag 12 will float in the vessel 10, such that the liquid mixture 20 in the vessel 10 will contact the adsorbing oleophillic material. As the material of the bag 12 adsorbs the second liquid component, i.e. the oil, the weight of the bag 12 will increase and consequently, the bag 12 will move downwardly in the vessel 10.

As the bag 12 moves downwardly, it will be appreciated that fresh adsorbing material will be presented at a surface 21 of the liquid 20 in the vessel 10, where the oil will tend to accumulate.

Any oil, emulsified or not which enters the vessel 10 through the inlet 13, which is not initially removed by contact with the oleophillic material in the bag 12, will fall into the liquid 20 contained by the vessel 11 in which the bag 12 is floating. The lower density of oil in any form will tend to cause the oil to float at or near the surface 21 of the liquid where it can again make contact with the oleophillic material of the bag 12 and thus be adsorbed.

As yet more liquid mixture is introduced into the vessel 10, liquid being mainly first liquid component, i.e. water, will pass through the outlet 14 into the chamber 15 and through the carbon filter 16 therein for final cleaning.

As yet more liquid mixture is introduced into the vessel 10, more and more oil will be adsorbed by the oleophillic material of the bag 12, causing the bag 12 to increase in weight and to sink yet further into the liquid 20. Any oil adsorbed into an upper portion 23 of the bag 12 may tend to flow downwardly so that oil tends to collect in a lower portion 24 of the bag 12. Thus fresh oleophillic material will tend to be presented at the liquid surface 21 to make contact with the floating oil. This process will continue until all or at least most of the oleophillic material of the bag 12 is saturated with oil at which stage the bag 12 will be floating low in the liquid 20, as indicated in FIG. 2, and will require replacement. This Low level may be indicated by an indicator 25 attached to the bag 12.

Oleophillic material of suitable kind is readily available in various forms including as a melt blown polymer. The oleophillic material may be contained in a net or porous or perforated container such as the bag 12, and at least before being contaminated with oil such material is light in weight enabling it readily to float in the vessel 10

Should the oleophillic material not be entirely hydrophobic, and should the initial weight of the bag 12 or other container, be such that a lower portion 24 of the bag 12 sinks below the surface 21 of the liquid 20 in the vessel 10 before the oleophillic material is contaminated with second liquid component, water may be absorbed from the liquid 20 in the vessel 10 thus causing the bag 12 to sink further. Thus the bag 12 may float too low or even sink altogether before adsorbing the second liquid from the mixture. This problem is worse where the vessel 10 is tall and narrow such that the weight of the bag 12 is supported on a small cross sectional area of liquid 20.

Where the bag 12 initially floats too low in the liquid mixture 20, the sunken portion will be unable to adsorb oil which will be floating at or near the surface 21 of the liquid 20.

Figure 5:
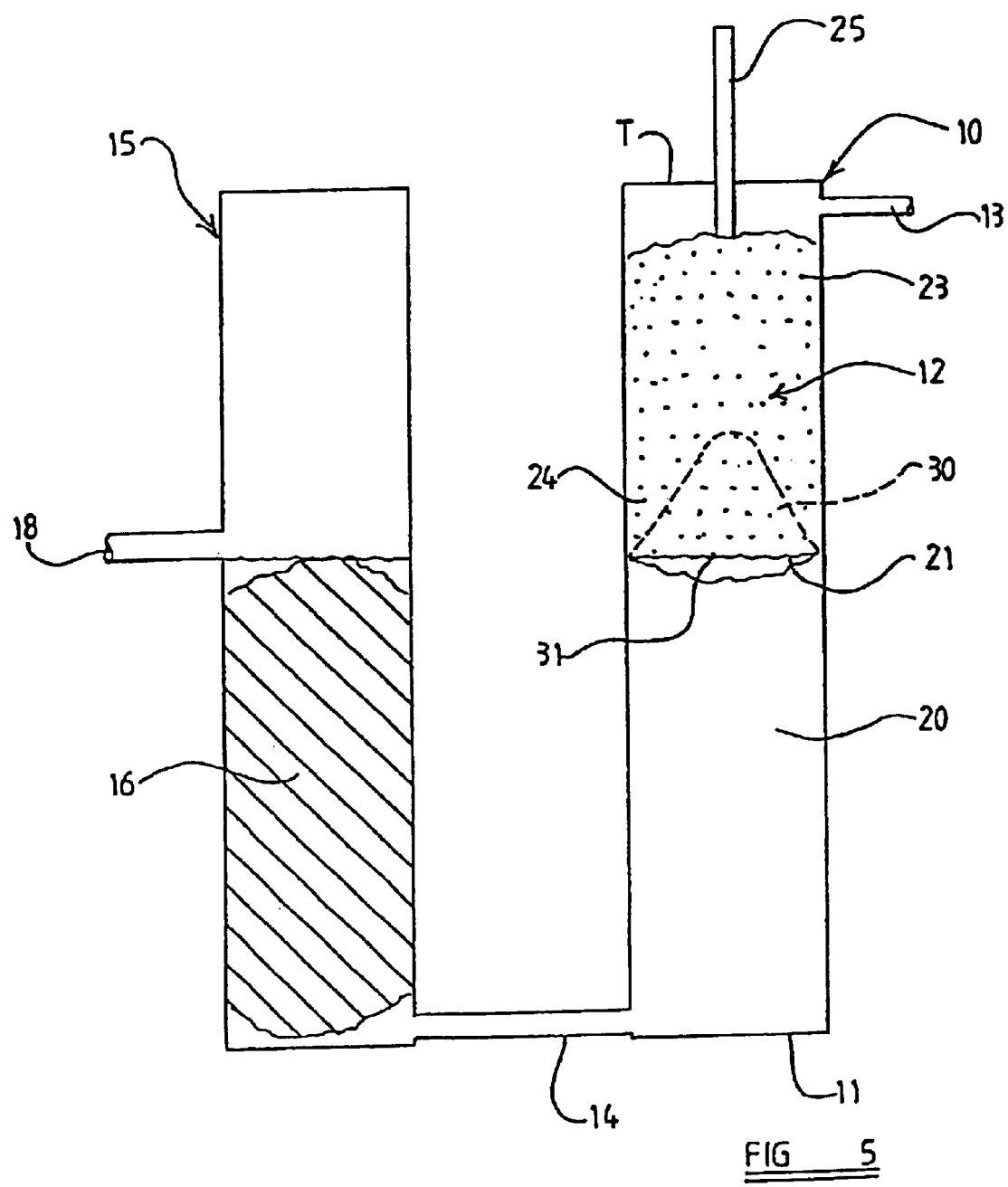
FIG. 5 is a view similar to FIG. 1 but of yet another embodiment.

Accordingly, as indicated in the arrangement of FIG. 5, preferably some means are provided to increase the buoyancy of the bag 12. In the example of FIG. 5, this includes a float 30 made for example, from a non-wettable expanded plastic material such as polystyrene. The amount of float material 30 used may be selected to be sufficient to ensure that the initial weight of the bag 12 of oleophillic material is cancelled out, so chat no, or only a minimal amount of the lower portion 24 of the bag 12 floats below the surface 21 of the liquid 20 in the vessel 10. In the example, the float material 30 is shaped to be generally conical, with a base 31 of the cone at the bottom of the separating member 12. Thus as the bag 12 adsorbs oil and sinks, as the cross section of the float 30 decreases the buoyancy afforded by the float 30 will decrease. The provision of the float 30 will also ensure that the maximum oil is adsorbed i.e. where no float or too small a float 30 is provided, the bag 12 may sink too fast resulting in under charging of the bag 12 with oil. Obviously the float 30 must not provide too much buoyancy or the bag 12 will not sink even when fully charged.

In another example (not shown) an alternative means for supporting the weight of the separating member 12 in the vessel 10 may be provided, such as for examples only, a spring from which the bag 12 may be suspended, e.g. a coil spring or a length of a suitable resilient material such as elastic or rubber, or a spring on which the bag 12 may be supported, or another counterbalance arrangement.

In each case, the weight of the bag 12 of oleophillic material is initially fully supported so that the oleophillic material is held at or near the surface 21 of the liquid 20 in the vessel 10, from which position the bag 12 will sink as the oleophillic material increasingly becomes contaminated with oil.

In this way, the absorption of water from the liquid mixture 20 in the vessel 10 by the oleophillic material is reduced to a minimum or prevented altogether, because the only portion of the bag 12 which will be below the surface 21 of the liquid 20 and thus in contact with the water, will already be substantially completely contaminated with oil and thus unable to adsorb any more liquid.

Figure 3:
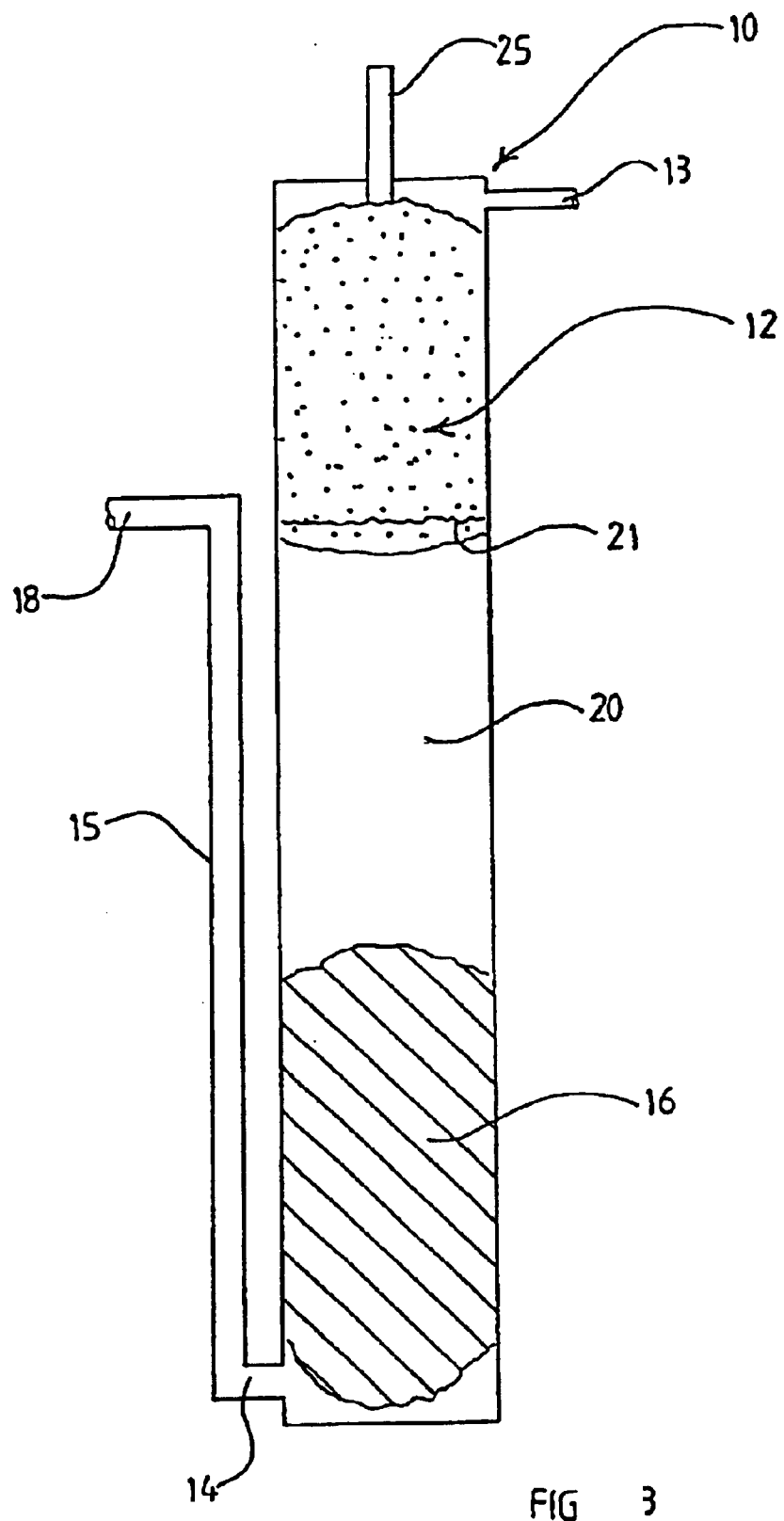
FIG. 3 is a view similar to FIG. 1 but of an alternative embodiment.

Referring to FIG. 3, in which similar parts to the apparatus of FIGS. 1 and 2 are labelled with the same reference numerals, instead of providing the carbon filter 16 in a chamber 15 which extends upwardly from the outlet 14 of the vessel 10, the vessel 10 may be sufficiently deep to accommodate the sunken bag 12 of oleophillic material, and the carbon or other filter 16. Again the liquid level 21 in the vessel 10 is governed by the level of an outlet 18 from an upwardly extending chamber 15 connected to the vessel outlet 14 which is located below the filter 16.

Referring to FIGS. 4 and 4a, again similar parts to the apparatus of FIGS. 1 and 2 are labelled with the same reference numerals.

In this example, the inlet 13 for the liquid mixture of oil and water, is provided between the top surface T and bottom 11 of the vessel 10. Thus introduced mixture does not pass downwardly through the bag 12 of oleophillic material contaminated with the oil. The heavier water will pass downwardly past and/or through the lower portion 24 of the bag 12 towards the outlet 14, whilst the oil will be adsorbed by the oleophillic materials of the bag 12.

The inlet 13 is in this example, a series of openings 13a around and in the sides of the vessel 10, from a settling tank 40 constructed about the vessel 10. The openings 13a are located so as to extend below the level of the outlet 18 from the upwardly extending chamber 15, so that the openings 13a do not act as weirs allowing primarily the oil into the vessel 10. The openings 13a are sufficiently large though, and extend above the level of the outlet 18 from the upwardly extending chamber 15, for even thick un-emulsified oil/water mixture, as well as a mixture of a "mayonnaise" consistency, to pass through the openings 13a into the vessel 10 with water.

The arrangement of FIG. 4 is particularly intended for use where a larger volume of oil/water mixture is to be handled, or where the mixture has a greater proportion of oil contamination.

Although the invention has been particularly described with reference to an arrangement in which the liquid mixture is an oil/water mixture being condensate from an air conditioning machine, the invention may be utilised for separating oil and water from any other mixture. Also, whereas the separating member 12 has been described as including an oleophillic material which is suitable for adsorbing oil, in another application where the two liquid components of the mixture do not include oil, another material which at least preferentially adsorbs contaminant, may be utilised.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. An apparatus for separating from a liquid mixture, first and second liquid components, wherein the first liquid component has a greater density than the second liquid component, the apparatus comprising a vessel having an inlet through which the mixture is introduced into the vessel, and an outlet through which separated first liquid is in use discharged, and there being a separating member within the vessel, the separating member including material which adsorbs the second liquid component, the separating member being adapted to move in the vessel downwardly in response to an increase in the weight thereof as second liquid is adsorbed, and wherein the inlet is positioned above the outlet, and the outlet is positioned towards a bottom of the vessel, so that the mixture passes down through the adsorbing separating member and is constrained to contact the separating member, as it flows from the inlet to the outlet.

2. An apparatus according to claim 1 wherein the inlet is positioned at a height between a top and bottom of the vessel generally at a level at which a lower part of the separating member is located prior to any second liquid being adsorbed thereby.

3. An apparatus according to claim 1 wherein the outlet of the vessel is connected to an upwardly extending chamber which itself has an outlet for the first liquid component, the liquid level in the vessel being governed by the height of the outlet from the chamber.

4. An apparatus according to claim 3 wherein the upwardly extending chamber includes a filter means for filtering from the first liquid component any entrained matter and/or residual second liquid component.

5. An apparatus according to claim 1 wherein the separating member is adapted to float in the vessel at a level determined by the volume of second liquid adsorbed thereby.

6. An apparatus according to claim 5 wherein the separating member includes a float to increase the buoyancy of the member so that prior to the adsorbing material of the separating member adsorbing second liquid component, the separating member floats so that a lower part thereof is at a desired height in the vessel.

7. An apparatus according to claim 1 wherein support means are provided to support the separating member in the vessel so that prior to the adsorbing material of the separating member adsorbing second liquid component, a lower part of the separating member is at a desired height in the vessel.

8. An apparatus according to claim 1 wherein the adsorbing material of the separating member is oleophillic such that the separating material is active to adsorb from a liquid mixture of oil and water, oil.

9. An apparatus according to claim 8 wherein the inlet receives liquid mixture being liquid condensate from an air compressor machine.

10. A method of separating from a liquid mixture, first and second liquid components, wherein the first liquid component has a greater density than the second liquid component, the method comprising introducing into a vessel through an inlet which is positioned above an outlet from the vessel, so that the mixture is constrained to pass downwardly through and into contact with a separating member in the vessel, which member includes a material which adsorbs the second liquid component, and discharging from the vessel through an outlet thereof separated first liquid component, and wherein the separating member is adapted to move in the vessel downwardly in response to an increase in the weight thereof as second liquid component is adsorbed thereby, and mixture is introduced into the vessel until the separating member has moved to a low position in the vessel.

11. A method according to claim 10 wherein the method includes filtering any entrained matter and residual second liquid component from a separated first liquid subsequent to contacting the mixture with the adsorbing material of the separating member.

12. A method according to claim 11 wherein the separated first liquid component is discharged from the vessel prior to filtering.

13. A method according to claim 10 wherein the liquid level in the vessel is controlled by the level of an outlet from an upwardly extending which is connected to the vessel outlet.

* * * * *

UNITED STATES PATENT AND TRADEMARK OFFICE
CERTIFICATE OF CORRECTION

PATENT NO. : 6,780,334 B1
DATED : August 24, 2004
INVENTOR(S) : John A. Timmins et al.

It is certified that error appears in the above-identified patent and that said Letters Patent is hereby corrected as shown below:

Title page,
Item [30], Foreign Application Priority Data, please delete "9913000" and replace with -- 9913000.7 --; please delete "9919741" and replace with -- 9919741.0 --; and please delete "0007601" and replace with -- 0007601.8 --.

Column 8,
Line 8, please insert the word -- chamber -- between the words "extending" and "which", so it reads "an upwardly extending chamber which".

Signed and Sealed this

First Day of March, 2005

JON W. DUDAS
*Director of the United States Patent and Trademark Office*